J. WILKINSON.
INDICATING AND RECORDING FLOW METER.
APPLICATION FILED OCT. 9, 1912.
1,170,204.
Patented Feb. 1, 1916.
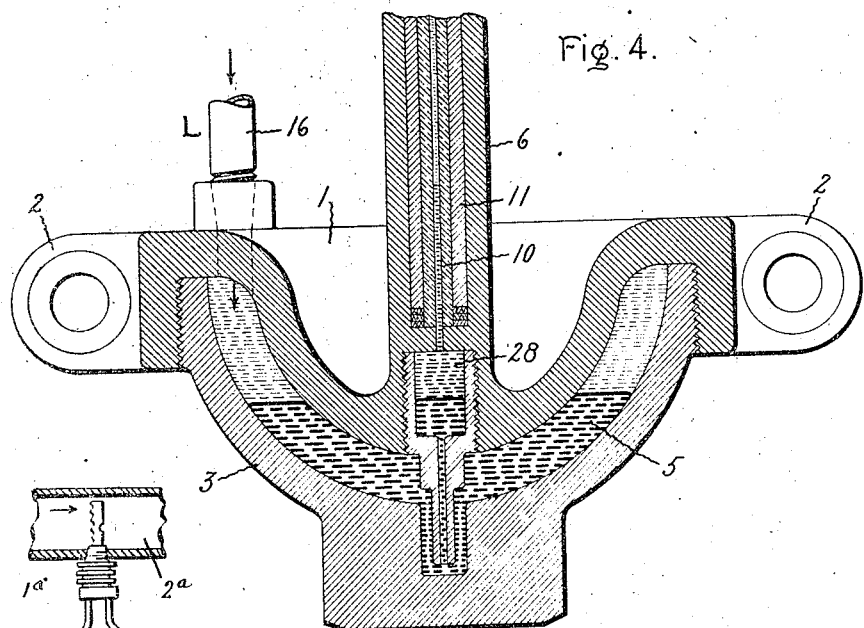
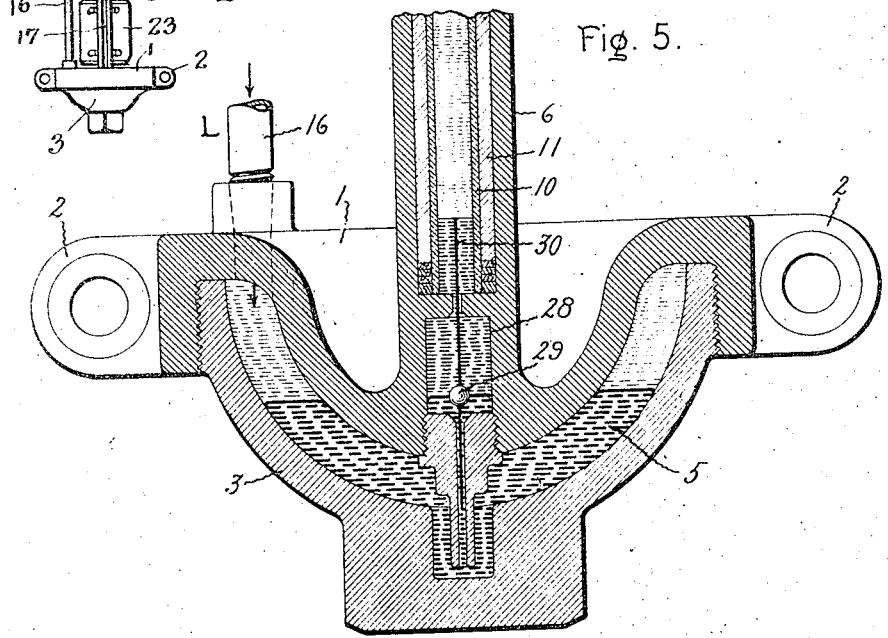
Witnesses:
Inventor:
James Wilkinson,
by
His Attorney.

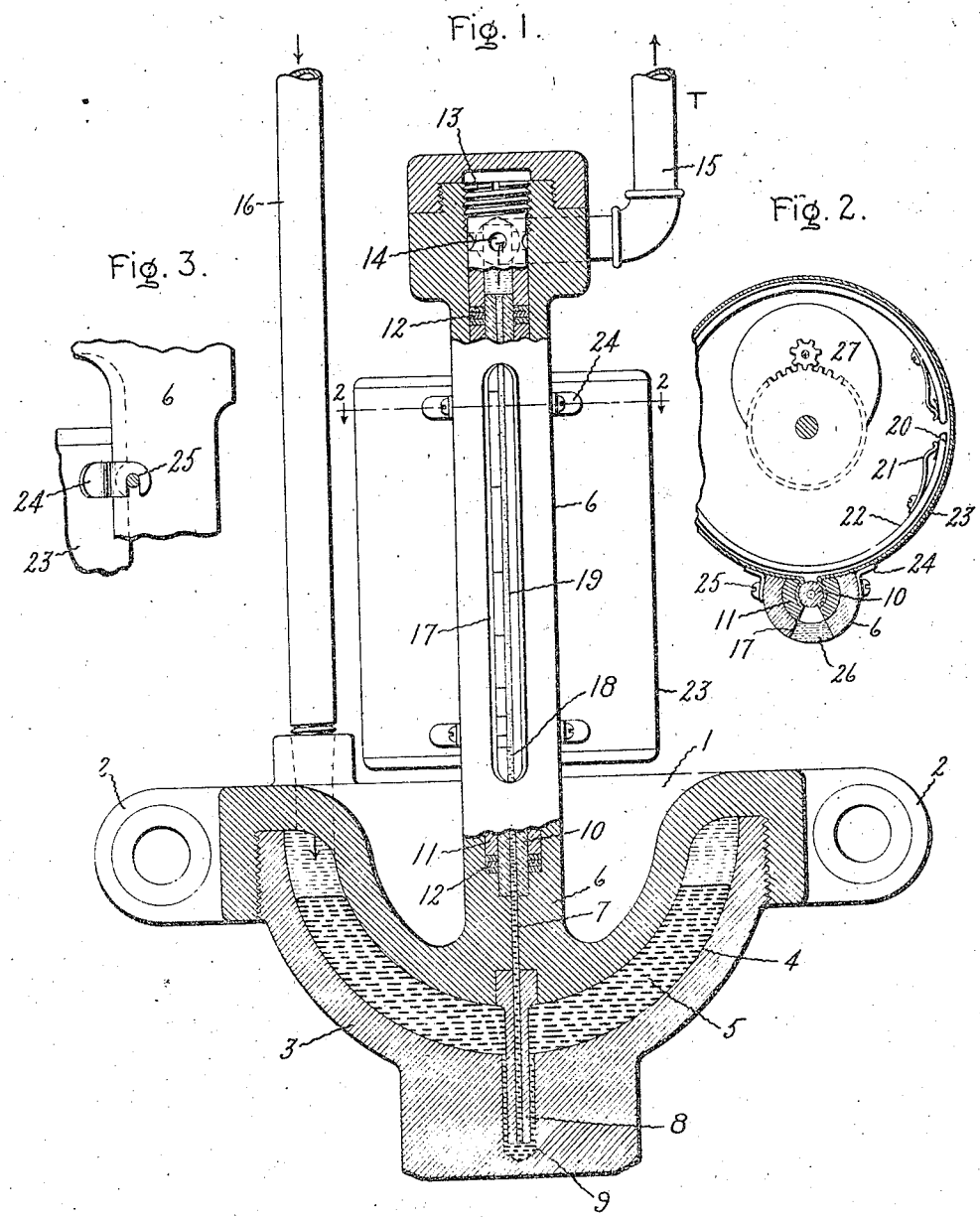

the mercury if the meter is severely
UNITED STATES PATENT OFFICE.

JAMES WILKINSON, OF BOSTON, MASSACHUSETTS, ASSIGNOR TO GENERAL ELECTRIC COMPANY, A CORPORATION OF NEW YORK.

INDICATING AND RECORDING FLOW-METER.

1,170,204.    Specification of Letters Patent.    Patented Feb. 1, 1916.

Application filed October 9, 1912.  Serial No. 724,735.

*To all whom it may concern:*

Be it known that I, JAMES WILKINSON, a citizen of the United States, residing at Boston, county of Suffolk, State of Massachusetts, have invented certain new and useful Improvements in Indicating and Recording Flow-Meters, of which the following is a specification.

This invention relates to instruments for indicating and recording the flow of a fluid through a conduit, and its object is to provide an improved structure of this type. In the ordinary type of flow meter, a pressure-difference device such as a Venturi or Pitot tube or the like is inserted in the conduit through which flows the fluid to be metered. The differing pressure regions of this pressure difference device are connected respectively with the two legs of a U-shaped tube or equivalent indicator in which a mass of mercury is movable to and fro by the variations in pressure. My invention has special reference to this type of indicating instrument, and the features of novelty will appear from the following detailed description and appended claims.

In the accompanying drawings, Figure 1 is a front elevation of the instrument, partly in section. Fig. 2 is a cross section on the line 2—2, Fig. 1, partly broken away on one side. Fig. 3 shows one of the hooks for suspending the photographic recording apparatus. Figs. 4 and 5 are views somewhat similar to Fig. 1, showing respectively two modified constructions. Fig. 6 shows the instrument connected to a pressure difference creating device arranged in a conduit.

The body of the instrument is a circular casing having a dished top 1 provided with lugs 2 for attaching it to a suitable support. Into said top is screwed a hemispherical bottom 3 forming with said top a hemispherical chamber 4 for the mercury 5. From the center of the top rises a vertical stem 6 through which runs a small upright passage 7, which is continued downward by a tube 8 depending into a well 9 in the bottom 3. The well is only a little larger than the tube, so that the mercury has to pass down through a comparatively narrow annular space in order to enter the lower end of the small upright passage 7. This feature serves to throttle the flow of the mercury, and dampen out any minor fluctuations, also to prevent the water on the leading side by-passing the mercury if the meter is severely oscillated or jarred. The stem 6 is counterbored for the greater portion of its length to receive a glass tube 10 whose bore forms a continuation of the passage 7. Surrounding the glass tube is a spacer 11, which has liquid-tight packing 12 at each end. A cupped plug 13 is screwed into the upper end of the stem to press upon the packing 12. Holes 14 in said plug connect the tube 10 with a pipe 15 running to the lower pressure region of the pressure difference device in the conduit. The higher pressure region thereof connects by a pipe 16 with the annular space above the mercury in the chamber 4.

Referring to Fig. 6 I have shown a pressure difference creating device in the form of a nozzle plug 1ª arranged in the conduit 2ª and connected to pipes 15 and 16 in the usual manner. It will be understood that any suitable form of pressure difference creating device may be used. A longitudinal slot 17 is cut through the stem 6 and the spacer 11 to expose to view the glass tube 10. Inasmuch as the level of the mercury is below the bottom of said slot, the passage 7 and the lower end of the glass tube are filled with an opaque liquid 18, the upper end of the column being visible through the lower portion of the slot 17. Above the opaque liquid the glass tube is filled with a clear liquid 19, such as water. In order to make a permanent record of the fluid flow, the stem 6 and spacer 11 are slotted lengthwise at the back so as to permit light to pass through from the front and impinge upon a sheet 20 of sensitive photographic paper held by clips 21 upon the exterior of a drum 22. A casing 23 incloses said drum and is secured to the back of the stem in any suitable manner, preferably by means of hooks 24 engaging headed studs 25 on said stem. The casing has a longitudinal slot registering with the slots in the stem and spacer. A glass lens or prism 26 fills the front slot in the stem to focus the light upon the sensitive paper in a thin upright line. The drum and paper are revolved slowly by clockwork 27. The differences in pressure in the leading and trailing pipes 16 and 15 cause the mercury to rise and fall in the passage 7, and with it the visible column of opaque liquid, whose varying heights are photographed upon the slowly revolving sensitive paper.

Fig. 4 shows means for multiplying the movements of the mercury by providing an auxiliary chamber 28 at the center of motion of the hemispherical chamber 4. The chamber 28 is filled partly with mercury and partly with opaque liquid and is considerably larger in diameter than the bore of the tube 10, so that any movement of the mercury will cause a greater rise and fall of the opaque liquid in said tube in proportion to the ratio between the squares of the diameters of the chamber 28 and the bore of the tube 10.

Fig. 5 shows a chamber 28 for the mercury and opaque liquid but the bore of the tube 10 is considerably larger than in the previous figures. There is also an indicator of the mercury level, preferably a small ball 29 floating on the mercury in the chamber 28 and carrying a wire 30 which projects up into view inside the tube 10, so that the observer can always know the height of the mercury in the chamber 28. The ball also acts as a valve to close the exits from the upper and lower ends of the chamber 28 in case of any disarrangement or breakage of the apparatus or other abnormal condition causing excessive pressure in one leg or the other of the meter. By this means the mercury cannot be blown out of the manometer over into the main and lost.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A steam flow meter, comprising a casing having a hemispherical chamber for mercury, a stem rising centrally therefrom and having a central passage, a glass tube in said stem communicating with said passage, and means for connecting the mercury chamber and said glass tube respectively with the higher and lower pressure regions of a pressure-difference device.

2. A steam flow meter, comprising a casing having a dished top and a bowl-shaped bottom forming a hemispherical chamber for mercury, a stem rising centrally from said top and having a central counterbored passage, a glass tube in said counterbore, and means for connecting the top of the chamber and the upper end of the glass tube respectively with the higher and lower pressure regions of a pressure difference device.

3. A steam flow meter, comprising a hemispherical chamber, a mass of mercury therein, a stem rising centrally from said chamber and having a central passage, a well in the bottom of said casing, a tube connecting with said passage and depending into said well, a glass tube in said stem, a quantity of opaque liquid in said glass tube, and a slot in said stem for exposing said liquid.

4. A steam flow meter, comprising a hemispherical chamber for mercury, a slotted stem, a glass tube therein communicating with said chamber and containing opaque liquid, means for connecting the higher and lower pressure regions of a pressure difference device with said chamber and tube respectively, and means with which said opaque column of liquid coöperates to show the flow.

5. A steam flow meter, comprising a hemispherical chamber for mercury, a slotted stem containing a glass tube communicating with said chamber, means for connecting the higher and lower pressure regions of a pressure-difference device with said chamber and tube respectively, and means with which the liquid in the tube coöperates to show the flow.

6. A steam flow meter, comprising a casing having a dished top and a bowl-shaped bottom forming a hemispherical chamber, a tubular slotted stem rising centrally from said top, a glass tube therein, an auxiliary chamber in said stem, a mass of mercury partly filling the two chambers, and a quantity of opaque liquid in said auxiliary chamber and the glass tube.

7. A steam flow meter, comprising a casing having a dished top and a bowl-shaped bottom forming a hemispherical chamber, a tubular slotted stem rising centrally from said top, a glass tube therein, an auxiliary chamber in said stem, a mass of mercury partly filling the two chambers, a quantity of opaque liquid in said auxiliary chamber and the glass tube, a float valve resting on the mercury in the auxiliary chamber and adapted to close the entrance and exit thereof, and a wire extending from said float up into the glass tube to indicate the level of the mercury.

8. A steam flow meter having a wide chambered base comprising a lower section and a top, an upright tubular central stem integral with said top, an extension of said stem depending from said top into the chamber, a longitudinal slot in said stem, a glass tube in said stem, packing for said tube above and below said slot, and means for connecting the chamber in the base and the space above the top of the tube, respectively, with the higher and lower pressure regions of a pressure-difference device.

9. A steam flow meter having a wide chambered base, comprising a lower section having a well in its bottom and a top having an upright integral tubular stem, a tubular plug depending from said top into said well, a longitudinal slot in said stem, a glass tube in said stem extending above and below said slot, and means for connecting the high and low pressure regions of a pressure-difference device with the chambered base and with the upper end of said tube, respectively.

10. A steam flow meter having a base containing a chamber, a body of mercury in said chamber, a tubular stem rising from the base and having an extension projecting down into said mercury, said stem having a glazed longitudinal slot, a float in said stem having a rod whose upper end is observable through said slot, and means for connecting said chamber and the upper end of said stem respectively with the high and low pressure regions of a pressure-difference device.

11. The combination of a U-tube manometer having a valve seat in one of its legs, and a float valve which rides on the indicating fluid below said seat, said valve being adapted to seat on said seat to cut off communication between the two sides of the manometer in case of excess pressure on one side thereof.

12. The combination of a U-tube manometer having a valve seat in one of its legs, and a float valve which rides on the indicating fluid above said seat, said valve being adapted to seat on said seat to cut off communication between the two sides of the manometer in case of excess pressure on one side thereof.

13. The combination of a U-tube manometer having spaced valve seats in one of its legs, and a float valve which rides on the indicating fluid between said seats, said valve being adapted to seat on said seats to cut off communication between the two sides of the manometer in case of excess pressure on one side or the other of the manometer.

In witness whereof, I have hereunto set my hand this 8th day of October, 1912.

JAMES WILKINSON.

Witnesses:
BENJAMIN B. HULL,
HELEN ORFORD.